J. A. COGSWELL.
PRESERVING SHIELD FOR POLES AND POSTS.
APPLICATION FILED DEC. 10, 1908.
933,291.                                  Patented Sept. 7, 1909.
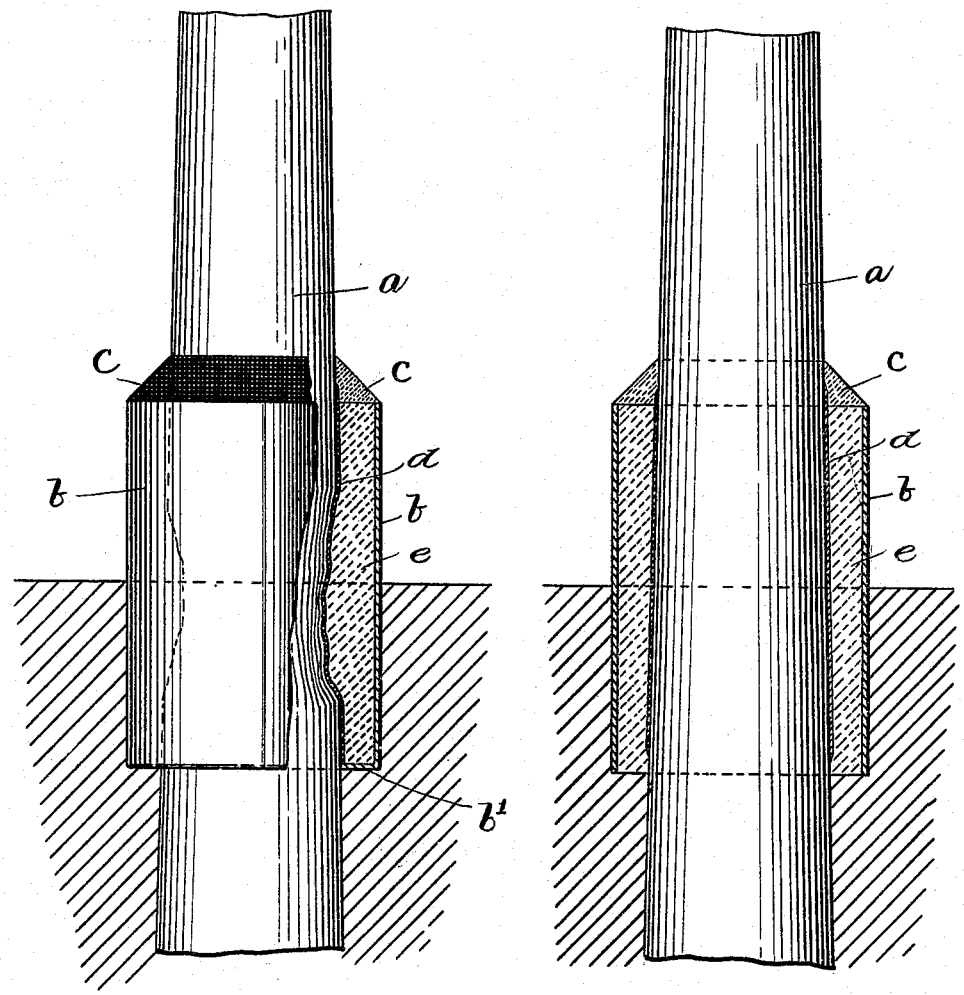
Fig. 1.                                   Fig. 3.
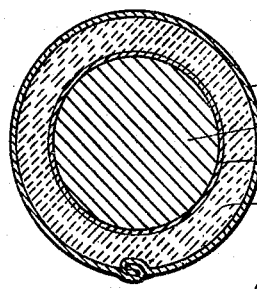
Fig. 2.

UNITED STATES PATENT OFFICE.

JAMES A. COGSWELL, OF MALDEN, MASSACHUSETTS, ASSIGNOR OF ONE-FOURTH TO WILLIAM H. STEWART, ONE-FOURTH TO JOSEPH D. LOWE, AND ONE-FOURTH TO LOUIS AUERBACH, ALL OF BOSTON, MASSACHUSETTS.

PRESERVING-SHIELD FOR POLES AND POSTS.

933,291.  Specification of Letters Patent.  Patented Sept. 7, 1909.

Application filed December 10, 1908. Serial No. 466,762.

*To all whom it may concern:*

Be it known that I, JAMES A. COGSWELL, of Malden, county of Middlesex, State of Massachusetts, have invented an Improvement in Preserving-Shields for Poles and Posts, of which the following is a specification.

Poles for electric wires and similar purposes, and also posts, which are set in the ground, have a tendency to decay more quickly at or near the surface of the ground than at any other place; and this invention has for its object to construct an improved shield which is adapted to be applied to a pole or post on a level with the surface of the ground and to extend short distances both above and below said level, which preserves and strengthens the pole.

Figure 1 is a side elevation and longitudinal vertical section of a preserving shield for poles and posts embodying this invention. Fig. 2 is a cross section of the shield shown in Fig. 1. Fig. 3 is a longitudinal vertical section of a modified form of shield.

$a$ represents the pole or post. It is herein shown as having been set in the ground for a period of time, and as having become partially decayed. It will be observed that the decayed portion is represented at the level of the surface of the ground and extends short distances both above and below said level.

My newly constructed shield comprises an outer case $b$, of cylindrical or other form, which may be made of galvanized sheet-iron, or any other suitable material. It is made considerably larger in diameter than the pole $a$, and surrounds said pole. It is made long enough to extend short distances both below and above the level of the ground when placed in position on the pole. The ends of said sheet-iron plate are secured together in any suitable manner, as for instance, by an ordinary tinman's joint, which is flattened or secured after the plate has been placed around the pole.

The decayed portion of the pole is first thoroughly cleaned. It is then coated as at $d$ with a liquid paint having preserving qualities which forms a waterproof film thereon; then the outer case is applied and then the space between said case and the coated pole is filled with a composition of matter as $e$ which adheres to the case and also to the coated pole. The outer case may have a bottom piece $b'$, as shown in Fig. 1, or said bottom piece may be omitted, as shown in Fig. 3. A cap $c$ is then applied to the top of the interposed filler and case, which is beveled or otherwise formed.

The liquid paint which I may employ consists of the following ingredients:—

Crude petroleum oil _____ 1 gal.
Creosote _____ 1 "
Sulfur _____ 1 lb.
Sulfate of iron _____ 2 lbs.

Such a liquid paint is very effective as a preserving agent, and is also waterproof, although other liquid paints may be employed in lieu thereof.

The composition of matter which I may employ for filling the space between the outer case and the pole consists of the following ingredients:—

Portland cement _____ 25 lbs.
Sand _____ 25 "
Sulfur _____ 2 "

to which is added say from one to one and a half per cent. of an insoluble lime salt of a fatty acid, substantially free from glycerin and other soluble substance, as for instance, insoluble stearate of lime. Such a composition of matter is waterproof, particularly by reason of the insoluble stearate of lime which is employed, and is very tenacious and clings to the case and also to the pole, and, therefore, forms an excellent binder and is well suited to the requirements. Other compositions of matter may be employed in lieu thereof, but it is essential that the composition of matter which is employed shall be waterproof and shall have the capability of clinging tenaciously to both the outer case and the pole.

For producing the cap $c$ I may employ the same composition of matter which is employed as the filler, adding thereto a small quantity of lamp-black, or other coloring matter.

This shield, it will be observed, which surrounds the pole, extends laterally and being in intimate contact therewith, serves to shed the water which runs down the pole and thereby prevents an accumulation of water at the lower end of the pole.

Having thus described my invention, what I claim as new and desire to secure by Letters Patent is:—

1. A preserving and strengthening shield for poles consisting of an outer case of larger diameter than the pole, which surrounds the pole, a film of waterproof wood-preserving material in intimate contact with the pole, and a composition of matter interposed between said case and the coated pole, which intimately engages both the case and the coated pole, containing cement, sand and an insoluble lime salt of a fatty acid, substantially free from glycerin or other soluble substance, substantially as described.

2. A preserving and strengthening shield for poles consisting of an outer case of larger diameter than the pole, which surrounds the pole, a film of waterproof wood-preserving material in intimate contact with the pole, and a waterproof cementitious compound containing an insoluble lime salt of a fatty acid, substantially free from glycerin or other soluble substance interposed between said case and the coated pole, which intimately engages both the case and the coated pole, substantially as described.

3. A preserving and strengthening shield for poles consisting of an outer case of larger diameter than the pole, which surrounds the pole, a film of waterproof wood-preserving material in intimate contact with the pole, and a composition of matter interposed between said case and the coated pole, which intimately engages both the case and the coated pole, consisting of cement, sand, sulfur and an insoluble lime salt of a fatty acid, substantially free from glycerin or other soluble substance, substantially as described.

In testimony whereof, I have signed my name to this specification, in the presence of two subscribing witnesses.

JAMES A. COGSWELL.

Witnesses:
B. J. NOYES,
H. B. DAVIS.